(12) United States Patent
Shimoyama et al.

(10) Patent No.: US 9,188,497 B2
(45) Date of Patent: Nov. 17, 2015

(54) DIFFERENTIAL PRESSURE SENSOR

(75) Inventors: Isao Shimoyama, Tokyo (JP); Kiyoshi Matsumoto, Tokyo (JP); Tomoyuki Takahata, Tokyo (JP); Tetsuo Kan, Tokyo (JP); Kenta Kuwana, Tokyo (JP); Hidetoshi Takahashi, Tokyo (JP); Minh-Dung Nguyen, Tokyo (JP)

(73) Assignee: The University of Tokyo, Tokyo (JP)

( * ) Notice: Subject to any disclaimer, the term of this patent is extended or adjusted under 35 U.S.C. 154(b) by 106 days.

(21) Appl. No.: 13/982,390

(22) PCT Filed: Jan. 11, 2012

(86) PCT No.: PCT/JP2012/050321
§ 371 (c)(1),
(2), (4) Date: Sep. 17, 2013

(87) PCT Pub. No.: WO2012/102073
PCT Pub. Date: Aug. 2, 2012

(65) Prior Publication Data
US 2014/0000378 A1    Jan. 2, 2014

(30) Foreign Application Priority Data

Jan. 28, 2011  (JP) ................................ 2011-017168

(51) Int. Cl.
| | |
|---|---|
| *G01L 9/00* | (2006.01) |
| *G01L 9/06* | (2006.01) |
| *H04R 21/02* | (2006.01) |
| *G01L 13/02* | (2006.01) |
| *G01L 19/14* | (2006.01) |

(52) U.S. Cl.
CPC . *G01L 9/06* (2013.01); *G01L 13/02* (2013.01); *H04R 21/02* (2013.01); *G01L 9/0042* (2013.01); *G01L 9/0054* (2013.01); *G01L 19/147* (2013.01)

(58) Field of Classification Search
CPC .... G01L 19/147; G01L 9/0054; G01L 9/0042
USPC .......................................... 73/754, 753, 700
See application file for complete search history.

(56) References Cited

U.S. PATENT DOCUMENTS

| | | | |
|---|---|---|---|
| 5,189,777 A | 3/1993 | Guckel et al. | |
| 5,293,095 A * | 3/1994 | Tamura et al. | ................ 310/338 |

FOREIGN PATENT DOCUMENTS

| | | |
|---|---|---|
| JP | H04208827 A | 7/1992 |
| JP | H04294234 A | 10/1992 |
| JP | H08233672 A | 9/1996 |

OTHER PUBLICATIONS

N. Minh-Dung, H. Takahashi, K. Matsumoto and I. Shimoyama, Solid-State Sensors, Actuators and Microsystems Conference (Transducers), 2011 16th International, on pp. 898-901.*

(Continued)

*Primary Examiner* — Lisa Caputo
*Assistant Examiner* — Nathaniel T Woodward
(74) *Attorney, Agent, or Firm* — Locke Lord LLP (57) ABSTRACT

There is provided a differential pressure sensor capable of measuring a pressure fluctuation with a simple structure. The differential pressure sensor includes a main body formed with an air chamber, and an opening that causes an interior of the air chamber to be in communication with an exterior, and a detector provided at the opening. The detector includes a cantilever provided in a manner tiltable so as to block off the opening, and the cantilever is formed with a Piezo resistor layer.

5 Claims, 8 Drawing Sheets

(56) References Cited

OTHER PUBLICATIONS

H. Takahashi, K. Matsumoto and I. Shimoyama, "Air pressure sensor for an insect wing", Proceedings of IEEE 22nd MEMS Conference, pp. 825-828, 2009.*

M. Gel and I. Shimoyama, "Force sensing submicrometer thick cantilevers with ultra-thin piezoresistors by rapid thermal diffusion" J. Micromech. Microeng. 14 (2004) 423-428.*

H. Takahashi et al. "Air Pressure Sensor for an Insect Wing," Technical Digest of 22nd IEEE International Conference on Micro Electro Mechanical Systems, 825-828, (2009).

H. Takahashi et al. "Air pressure-difference on artificial insect wing with MEMS sensor," Technical Digest of 22nd IEEE Interntational Conference on Micro Electro Mechanical Systems, pp. 135-137, (2009).

Written Opinion issued in PCT/JP2012/050321, dated Feb. 7, 2012.

International Search Report in PCT/JP2012/050321, dated Feb. 7, 2012.

* cited by examiner

DIFFERENTIAL PRESSURE SENSOR

CROSS REFERENCE TO RELATED APPLICATIONS

This application is a U.S. National Stage application under 35 U.S.C. §371 of International Patent Application Serial No. PCT/JP2012/050321, filed Jan. 11, 2012, which Application claims the benefit of priority of Japanese Patent Application No. JP2011-017168, filed Jan. 28, 2011, the disclosures of each of which are expressly incorporated by reference in their entireties.

TECHNICAL FIELD

The present invention relates to a differential pressure sensor.

BACKGROUND ART

A pressure sensor that utilizes a change in electric capacitance in accordance with a deformation of a diaphragm is disclosed as a differential pressure sensor measuring a pressure fluctuation (see, for example, Patent Literature 1). The pressure sensor disclosed in Patent Literature 1 forms a hollow in an auxiliary layer covered by a diaphragm layer through pores in the diaphragm layer, and such pores are air-tightly closed without causing a part of a block-off layer on the diaphragm layer to be filled, thereby letting a diaphragm to have a desired deformation performance.

CITATION LIST

Patent Literature

Patent Literature 1: JP H08-233672 A

SUMMARY OF INVENTION

Technical Problem

According to the pressure sensor disclosed in Patent Literature 1, it is necessary to air-tightly block off the hollow provided at the lower portion of the diaphragm. Moreover, since the amount that the diaphragm can deform is small, the structure for measuring a change in an electric capacitance in order to measure a pressure fluctuation becomes complex, and is likely to be affected by noises.

Hence, it is an object of the present invention to provide a differential pressure sensor that can measure a pressure fluctuation with a simple structure.

Solution to Problem

The invention set forth in claim 1 relates to a differential pressure sensor that includes: a main body formed with an air chamber, and an opening that causes an interior of the air chamber to be in communication with an exterior; and a detector provided at the opening. The detector includes a cantilever provided in a manner tiltable so as to block off the opening, and the cantilever is formed with a Piezo resistor layer.

Advantageous Effects of Invention

According to the present invention, a structure is employed in which the cantilever provided in a tiltable manner so as to block off the opening detects a pressure fluctuation between the interior of the air chamber and the exterior thereof. Accordingly, in comparison with a conventional technology that needs to block off the air chamber using a diaphragm, it becomes possible to measure a pressure fluctuation with a simple structure.

DESCRIPTION OF EMBODIMENTS

A detailed explanation will be below given of an embodiment of the present invention with reference to the accompanying drawings.

Figure 1:
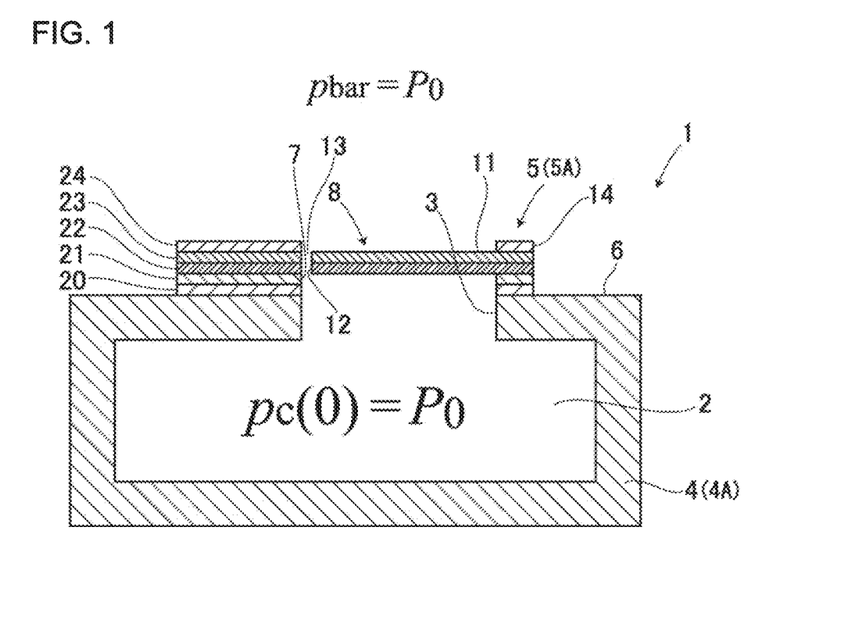
FIG. 1 is a vertical cross-sectional view illustrating a whole structure of a differential pressure sensor according to an embodiment.

A differential pressure sensor 1 illustrated in FIG. 1 includes a main body 4 with an air chamber 2 and an opening 3, and a detector 5 provided at the opening 3. The differential pressure sensor 1 allows the detector 5 to detect a differential pressure between the interior of the air chamber 2 and the exterior thereof. According to this embodiment, the main body 4 is formed by a first layer 4A that is an Si substrate, while the detector 5 is formed by a second layer 5A that is SOI. The differential pressure sensor 1 employs a structure in which the first layer 4A and the second layer 5A are laminated together.

The main body 4 is closed except the opening 3 in such a way that no air can flow in the air chamber 2 and flow out therefrom except the opening 3. The detector 5 is fastened to a surface 6 of the main body 4, and includes a communication channel 7 in communication with the opening 3, and a cantilever 8 provided in a manner tiltable so as to block off the communication channel 7 (and the opening 3). The communication channel 7 is formed in a similar shape to the opening 3.

The detector 5 includes a substrate 20, an insulating layer 21, a silicon (Si) layer 22, a Piezo resistor layer 23, and a metal layer 24. The silicon layer 22 and the Piezo resistor layer 23 form the cantilever 8. The cantilever 8 is elastically deformable around hinge portions 11 in accordance with a differential pressure produced between the interior of the air chamber 2 and the exterior thereof. It is not illustrated but an electrode 14 is electrically connected with a power supply that supplies a current to the Piezo resistor layer, and a signal converter that detects a change in the resistance of the Piezo resistor layer 23.

Figure 2:
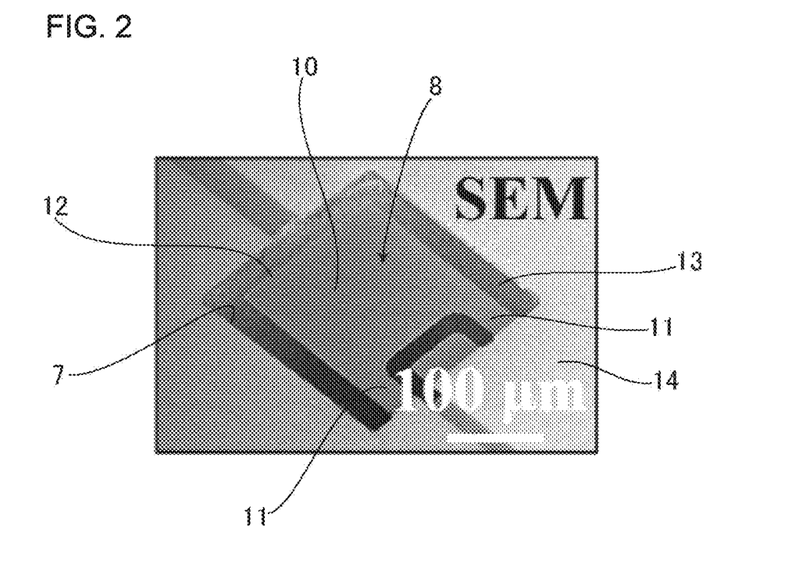
FIG. 2 is a perspective view illustrating a structure of a detector according to the embodiment.

As illustrated in FIG. 2, the cantilever 8 includes a pressure receiver 10 in a tabular shape and a pair of hinge portions 11 integrally formed on the one-side face of the pressure receiver 10. The cantilever is joined with the main body 4 through the hinge portions 11. The cantilever 8 has a gap 13 formed between an external edge 12 and the inner periphery of the communication channel 7 except the one-side face of the inner periphery of the communication channel 7. The gap 13 formed between the external edge 12 of the cantilever 8 and the inner periphery of the communication channel 7 is formed with a size that does not likely to allow air to flow between the interior of the air chamber 2 and the exterior thereof. The hinge portions 11 are electrically connected with the electrode 14.

It is preferable that the gap 13 should be equal to or smaller than substantially hundred times (equal to or smaller than 7 pin) of the average free path (70 nm) of molecules of gas (e.g., $N_2$ or air) flowing in the air chamber 2 from the exterior through the gap 13. When the gap 13 is larger than hundred times of the average free path (70 nm) of the molecules of gas, the differential pressure sensor 1 may have a sensitivity to a pressure change reduced.

The differential pressure sensor 1 is capable of detecting a change in the resistance when the cantilever 8 deforms and the flexed angle of the tip of the cantilever 8 becomes 0.01 degree. When, for example, the size (vertical×horizontal×thickness) of the cantilever is 100 μm×100 μm×0.3 μm, the flexed angle when a differential pressure is 10 Pa becomes 1 degree through a calculation, and thus the resolution at this time is 0.1 Pa through a calculation.

The thickness of the cantilever 8 is selected with the upper limit of the flexed angle being as 1 degree. When the size (vertical×horizontal×thickness) of the cantilever 8 is 20 μm×20 μm×0.03 μm, a differential pressure that causes a flexed angle of 1 degree is 1 Pa, and thus the resolution becomes 0.01 Pa. Moreover, when the size (vertical×horizontal×thickness) of the cantilever 8 is 500 μm×500 μm×3 μm, a differential pressure that causes a flexed angle of 1 degree is 100 Pa, and thus the resolution becomes 1 Pa. Based on the above discussion, it is preferable that the thickness of the cantilever 8 should be 0.03 μm to 3 μm. Moreover, it is further preferable that the thickness of the cantilever 8 should be 0.1 μm to 1 μm from the standpoint of the fabrication easiness. The thickness of the cantilever 8 is measurable through an SEM (Scanning Electron Microscope).

Next, a method for manufacturing the detector 5 will be explained with reference to FIGS. 3A to 3D.

Figure 3A:
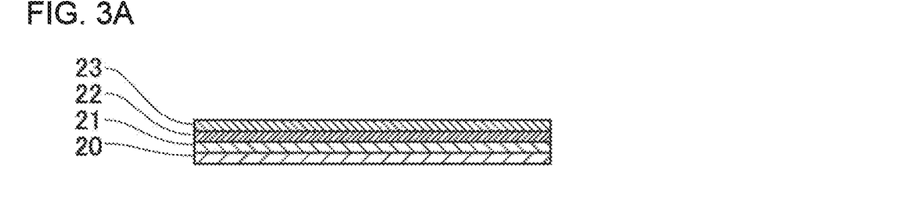
FIG. 3A is a vertical cross-sectional view illustrating a manufacturing process of the detector of the embodiment step by step and illustrating a condition in which a Piezo resistor layer is laminated.
Figure 3B:
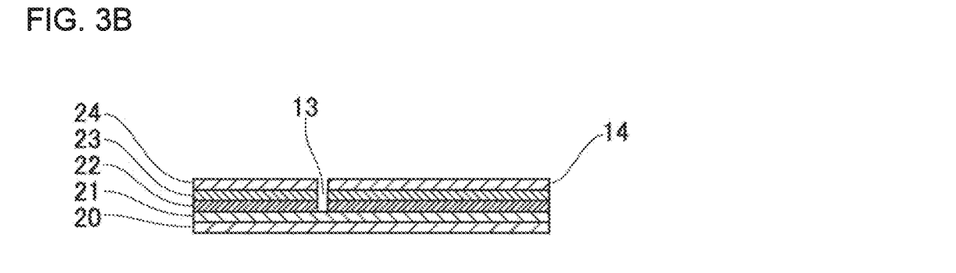
FIG. 3B is a vertical cross-sectional view illustrating a manufacturing process of the detector of the embodiment step by step and illustrating a condition in which a gap is formed.

First, the insulating layer 21 that is $SiO_2$ is formed on the substrate 20 that is Si, and the silicon layer 22 that is Si is formed on the insulating layer 21, thereby forming an SOI of a laminated structure including the substrate 20, the insulating layer 21, and the silicon layer 22. Next, impurities are doped on the silicon layer 22 to form the Piezo resistor layer 23 that is a part of the silicon layer 22 serving as an N-type or P-type semiconductor (FIG. 3A).

Next, the metal layer 24 is patterned on the Piezo resistor layer 23 on the SOI, and the silicon layer 22 and the Piezo resistor layer 23 are partially etched, thereby forming the gap 13 between the external edge 12 and the inner periphery of the communication channel 7 except the hinge portions 11 of the cantilever 8 explained above (FIG. 3B). At this time, a resist (unillustrated) is further formed partially on the top face of the metal layer 24.

Figure 3C:
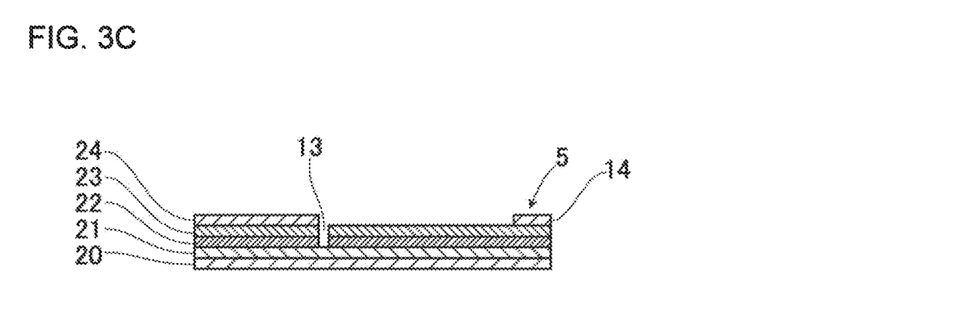
FIG. 3C is a vertical cross-sectional view illustrating a manufacturing process of the detector of the embodiment step by step and illustrating a condition in which an electrode is formed.
Figure 3D:
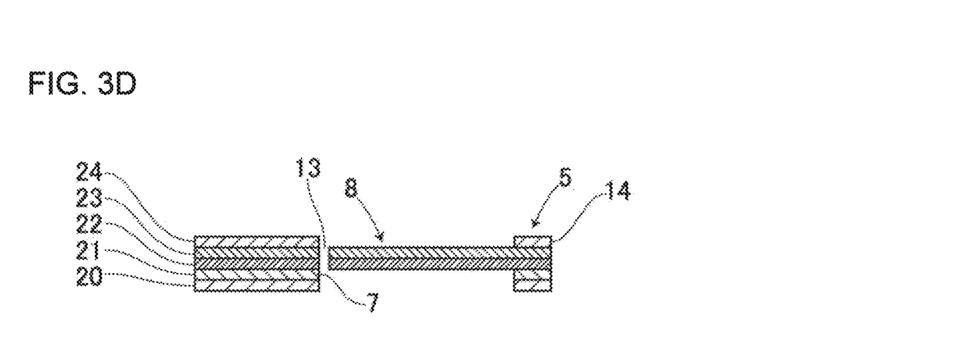
FIG. 3D is a vertical cross-sectional view illustrating a manufacturing process of the detector of the embodiment step by step and illustrating a condition in which a communication channel is formed and a cantilever is formed.

Subsequently, the metal layer 24 is further patterned to eliminate portions where no resist (unillustrated) is formed, and the resist is eliminated to form the electrode 14 (FIG. 3C). Next, the substrate 20 and the insulating layer 21 are etched from the bottom-face side to form the communication channel 7, thereby forming the cantilever 8 (FIG. 3D).

The detector 5 formed in this manner is fastened to the surface 6 of the main body 4 with the communication channel 7 being aligned with the opening 3 (FIG. 1). In this case, the communication channel 7 of the detector 5 and the opening 3 of the main body 4 become continuous. Moreover, the cantilever 8 is fastened to the main body 4 so as to disturb the flow of air flowing through the communication channel 7 (and the opening 3). Accordingly, the differential pressure sensor 1 having the detector 5 fastened to the main body 4 allows air to flow between the interior of the air chamber 2 and the exterior thereof through the gap 13 formed between the peripheral edge of the cantilever 8 and the inner periphery of the communication channel 7.

Next, an explanation will be given of the operation and advantageous effect of the differential pressure sensor 1 of this embodiment employing the above-explained structure. In the following explanation, an internal pressure of the air chamber 2 and an external pressure of the main body 4 will be referred to as an internal pressure ($p_c$) and an external pressure ($p_{bar}$), respectively.

First, when the internal pressure ($p_c$) and the external pressure ($p_{bar}$) are equal, e.g., when the differential pressure sensor 1 is held at a predetermined position in the height direction for a certain time, no cantilever 8 deforms (FIG. 1). The pressure of the internal pressure ($p_c$) and the external pressure ($p_{bar}$) in this case is taken as a reference pressure ($P_0$).

Figure 4:
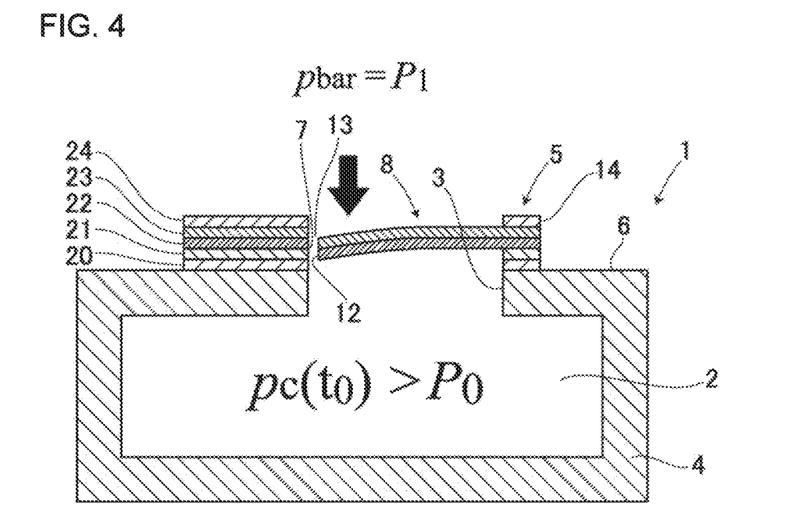
FIG. 4 is a vertical cross-sectional view illustrating a first usage condition of the differential pressure sensor according to the embodiment.

Next, when the differential pressure sensor 1 is moved in the height direction, for example, moved downwardly in the vertical direction, the external pressure ($p_{bar}$) becomes large relative to the reference pressure ($P_0$). In this case, a differential pressure is produced between the internal pressure ($p_c$) and the external pressure ($p_{bar}$). That is, the external pressure ($p_{bar}$) becomes large relative to the internal pressure ($p_c$). Hence, substantially simultaneously with the movement of the differential pressure sensor in the vertical direction, the cantilever 8 deforms downwardly around the hinge portions 11 (FIG. 4).

Figure 5:
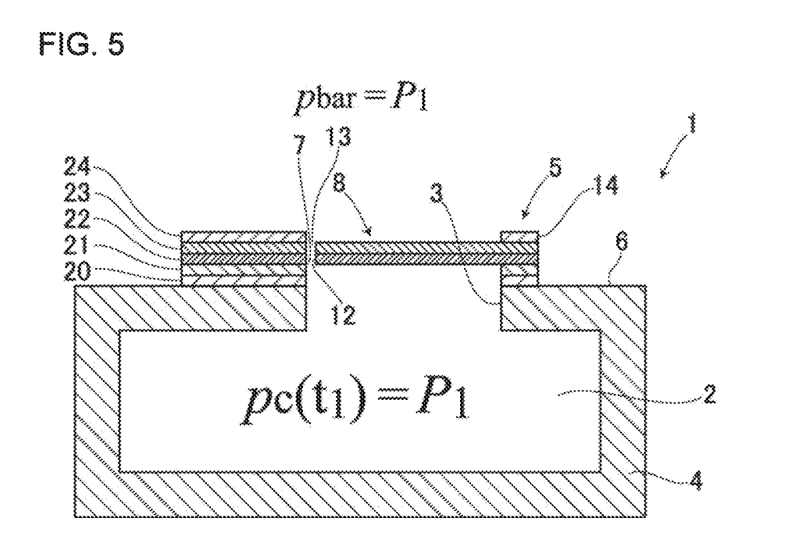
FIG. 5 is a vertical cross-sectional view illustrating a second usage condition of the differential pressure sensor according to the embodiment.

Next, air flows in the air chamber 2 from the exterior through the gap 13, and the internal pressure ($p_c$) increases as time advances. Together with the increase of the internal pressure ($p_c$), the deformation amount of the cantilever 8 becomes small. Thereafter, when the internal pressure ($p_c$) and the external pressure ($p_{bar}$) become equal, bar, the cantilever 8 returns to the original condition not deformed (FIG. 5).

Figure 6:
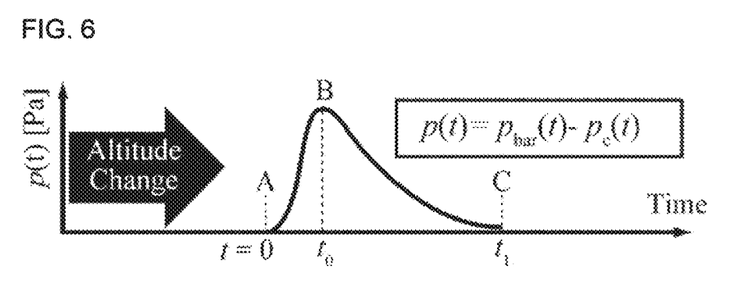
FIG. 6 is a graph exemplarily illustrating a relationship between, a differential pressure p(t) between an internal pressure Mt) and an external pressure $p_{bar}(t)$ in the differential pressure sensor of the embodiment, and a time.

FIG. 6 is a graph of a differential pressure p(t) between an internal pressure $p_c$(t) and an external pressure $p_{bar}$(t) together with the advancement of time. First, a condition in which the differential pressure sensor 1 is held at a predetermined position in the height direction for a certain time is the condition indicated by A in FIG. 6 (FIG. 1). In this case, p(t)=0. Next, when the differential pressure sensor is moved downwardly in the vertical direction at a time 0, p(t) increases, and becomes B in FIG. 6 at a time $t_0$ (FIG. 4). Next, air flows in the air chamber 2 from the exterior through the gap 13, and the internal pressure ($p_c$) and the external pressure ($p_{bar}$) 1 become substantially equal at a time $t_1$, and p(t) becomes substantially zero (C in FIG. 6, and FIG. 5).

The inventors of the present invention found that a differential pressure ΔP between the internal pressure ($p_c$) and the external pressure ($p_{bar}$) corresponds to an area surrounded by a curved line expressed as p(t)=$C_p$×ΔR(t)/R (where $C_p$ is a constant) and a horizontal line in this figure, and can be calculated from formula 1.

$$\Delta P = P_1 - P_0 \approx P_0 K \int_0^{t_1} \sqrt{\Delta R(t)/R} \, dt \quad \text{[Formula 1]}$$

where ΔR(t)/R is a change rate of a resistance of the cantilever 8, and K is a constant proportional to the volume of the air chamber 2 and $C_p$.

As explained above, the differential pressure sensor 1 of this embodiment employs a structure in which the cantilever 8 is fastened to the main body 4 with the gap 13 present between the cantilever and the inner periphery of the communication channel 7. Accordingly, in comparison with the conventional technology that needs to air-tightly close the air chamber 2 using a diaphragm, a pressure fluctuation can be measured through a simple structure.

Moreover, the cantilever 8 that is provided so as to block off the inner periphery of the communication channel 7 allowing the interior of the air chamber 2 formed in the main body 4 to be in communication with the exterior of the air chamber 2 detects a differential pressure between the interior of the air chamber 2 and the exterior thereof. Accordingly, the cantilever 8 can easily deform by a minute differential pressure, and thus the resolution can be remarkably improved in comparison with the conventional technology. More specifically, the differential pressure sensor 1 of this embodiment can obtain a resolution that is equal to or greater than 0.1 Pa.

The differential pressure sensor 1 of this embodiment is applicable to, for example, a vehicular navigation apparatus. When, for example, a vehicle running a general road enters a raised expressway laid over the general road therefrom, it becomes possible to determine whether the vehicle is running the general road or the expressway by measuring a differential pressure based on the difference in height between the general road and the expressway, and such a determination result can be reflected on a navigation result.

Moreover, the differential pressure sensor 1 of this embodiment is also applicable to a navigation apparatus built in a mobile phone, which enables a recording of the activity history of a user possessing such a mobile phone. Furthermore, the differential pressure sensor 1 is applicable to a microphone. Such a microphone is applicable to a mobile phone, and in this case, the differential pressure sensor 1 is applicable to a noise canceller microphone or a sound microphone.

Since the differential pressure sensor 1 is capable of detecting a pressure change in a room due to, for example, opening/closing of a door and a breakage of a window glass, the differential pressure sensor is applicable as a security system for a home or for a vehicle. Moreover, the differential pressure sensor is also applicable to a blood pressure measuring instrument.

First Example

In practice, the cantilever 8 with a length of 200 μm, a width of 160 mm, and a thickness of 0.3 μm was produced for an evaluation. The hinge portions 11 had a length of 40 μm and a width of 25 μm. The resonant frequency of the cantilever 8 was 335 kHz. This cantilever 8 was installed in a test device 30 illustrated in FIG. 7.

Figure 7:
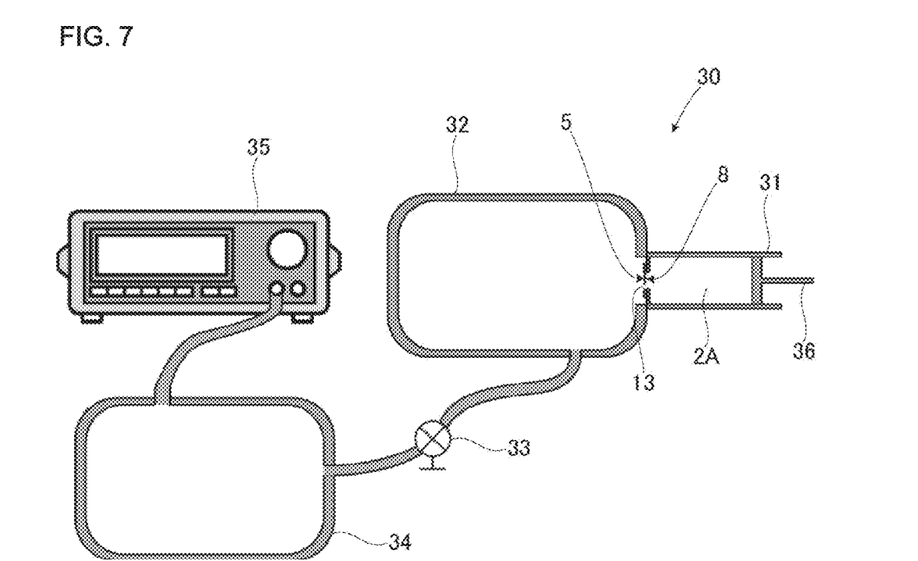
FIG. 7 is an exemplary diagram illustrating a structure of a test apparatus for evaluating the differential pressure sensor of the embodiment.

The test device 30 included a cylinder 31, a first chamber 32 in communication with the cylinder 31 across the cantilever 8, a second chamber 34 in communication with the first chamber 32 via a valve 33, and a compressor 35 supplying compressed air to the second chamber 34. The first chamber 32 and the second chamber 34 each had a volume of $3.5 \times 10^6$ mm³. A piston 36 was inserted in the cylinder 31, and thus the volume of an air chamber 2A between the cantilever and the piston was changeable as needed. The cantilever 8 had the gap 13 that was 10 μm.

The pressure inside the air chamber 2A and that of the first chamber 32 with the valve 33 being closed were taken as a reference pressure. In this condition, air with a predetermined pressure was supplied to the second chamber 34 from the compressor 35. When the internal pressure of the second chamber 34 reached a predetermined pressure P1, the valve 33 was opened. Accordingly, the internal pressure of the first chamber 32 was increased by the compressed air supplied from the second chamber 34, and a differential pressure AP was produced.

Figure 8:
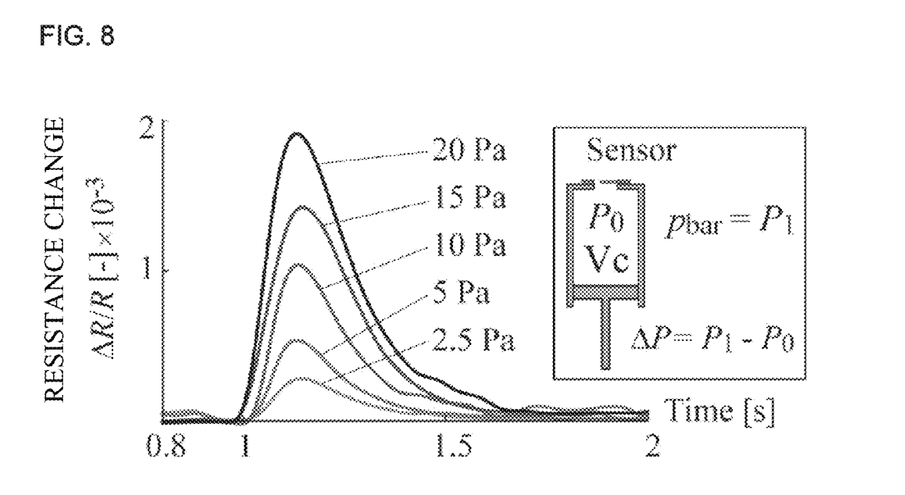
FIG. 8 is a graph illustrating a first evaluation result of the differential pressure sensor of the embodiment.

In this test device 30, with the volume of the air chamber 2A being maintained at $10^3$ mm³, the pressure P1 applied to the first chamber 32 was changed, and a relationship between a change in the resistance of the Piezo resistor layer 23 and an advancement in time at the differential pressure ΔP was studied (FIG. 8). As a result, it was confirmed that the differential pressure sensor 1 of this embodiment was capable of detecting a differential pressure from 2.5 Pa to 20 Pa.

Figure 9:
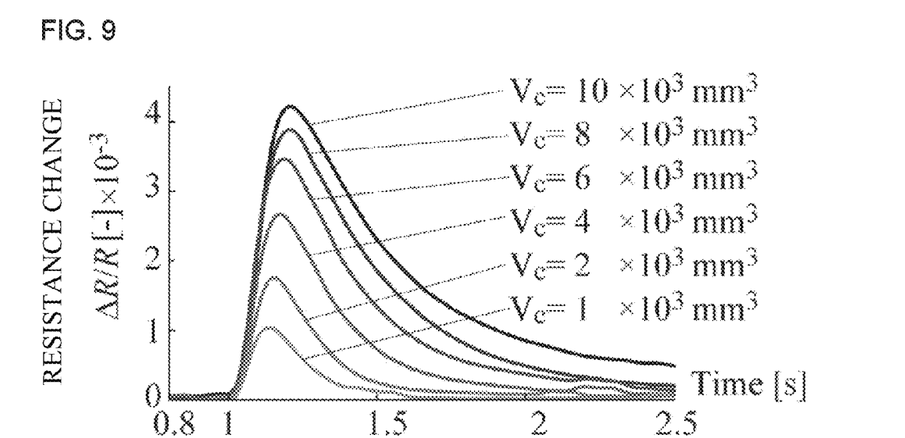
FIG. 9 is a graph illustrating a second evaluation result of the differential pressure sensor of the embodiment.

Next, the certain pressure P1 was applied to the first chamber 32 to set the differential pressure ΔP to be 10 Pa, and the volume of the air chamber 2A was changed between $1 \times 10^3$ mm³ to $10 \times 10^3$ mm³. In this condition, the relationship between a change in the resistance of the Piezo resistor layer 23 and an advancement in time was studied (FIG. 9). As a result, it was confirmed that the differential pressure sensor 1 of this embodiment had the resistance of the Piezo resistor layer 23 changed in accordance with the volume of the air chamber 2A. This will be a barometer for designing the differential pressure sensor 1 in an optimized manner.

Figure 10:
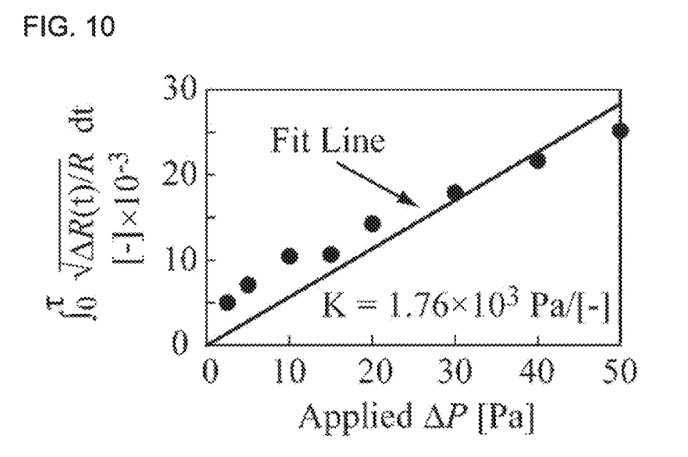
FIG. 10 is a graph illustrating a third evaluation result of the differential pressure sensor of the embodiment.

FIG. 10 is a graph illustrating a relationship between a value calculated from a measured value when the volume of the air chamber 2A was $10^3$ mm³ and the differential pressure ΔP actually applied. As a result, it was confirmed that according to the differential pressure sensor 1 of this embodiment, the constant k was $1.76 \times 10^3$ Pa.

Figure 11:
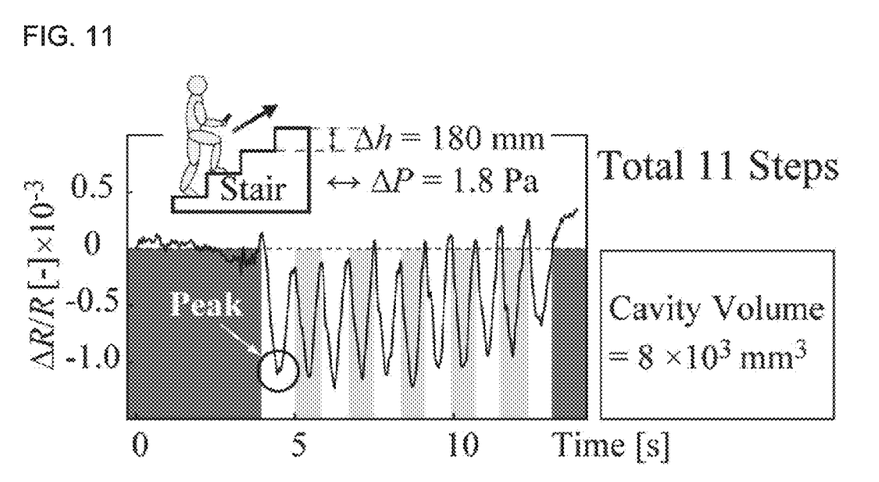
FIG. 11 is a graph illustrating a fourth evaluation result of the differential pressure sensor of the embodiment.

FIG. 11 illustrates a result of measuring a change in the resistance of the Piezo resistor layer 23 when the differential pressure sensor 1 of this embodiment was elevated through a stairway by 11 stages with each stage having a height of 180 mm with the differential pressure sensor of this embodiment being held. As a result, it was confirmed that the differential pressure sensor 1 of this embodiment was capable of detecting a change in ambient pressure, i.e., a differential pressure stage by stage at all 11 stages.

Second Embodiment

Figure 12:
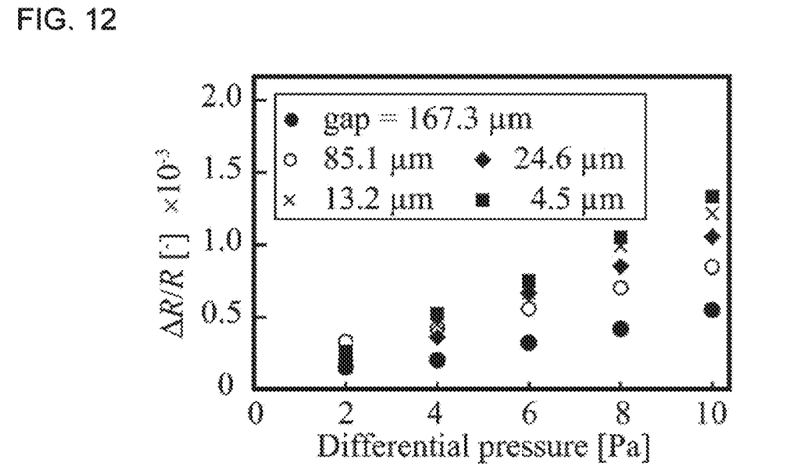
FIG. 12 is a graph illustrating a result of checking a relationship between a differential pressure and a change rate of resistor.

A differential pressure sensor having a cantilever with a thickness of 0.3 μm was manufactured, and a relationship between a pressure difference ΔP and a change rate in a resistance for each gap formed between the external edge of the cantilever and the inner periphery of the communication channel was checked (FIG. 12). Regarding the differential pressure sensor, four kinds of such sensors with different gaps that were 167.3 μm, 85.1 μm, 24.6 μm, 13.2 μm and 4.5 μm were prepared. As a result, it was confirmed that the larger the gap became, the smaller the change rate in a resistance became.

Figure 13:
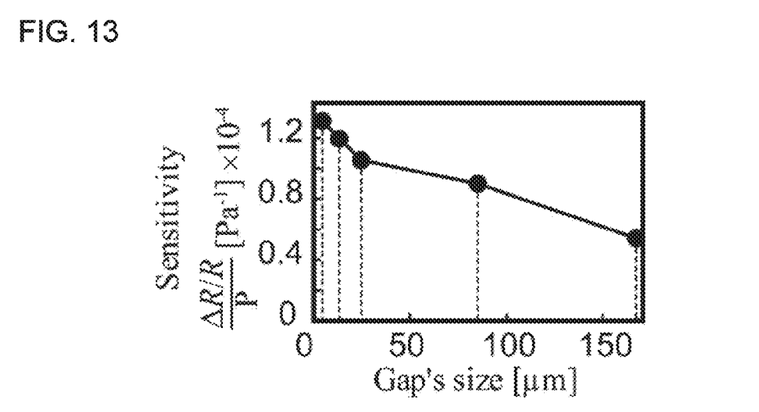
FIG. 13 is a graph illustrating a relationship between a sensitivity characteristic and a gap formed between an external edge of the cantilever and an inner periphery of the communication channel.

FIG. 13 illustrates a relationship between a gap and a sensitivity characteristic based on the results illustrated in FIG. 12. The sensitivity characteristic is a value obtained by dividing the measured change rate in a resistance by a differential pressure ΔP. It becomes clear from this figure that the larger the gap becomes, the lower the sensitivity characteristic becomes.

Figure 14:
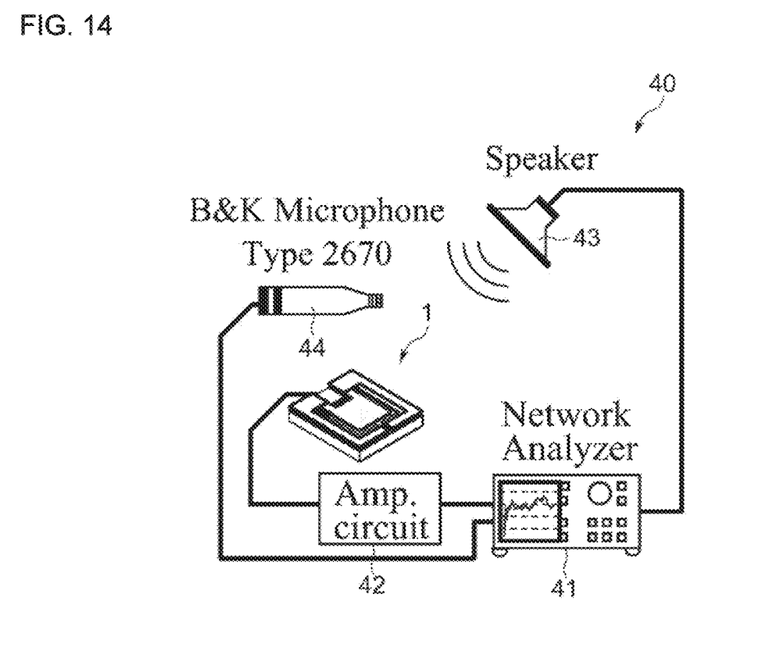
FIG. 14 is an exemplary diagram illustrating a whole structure of an apparatus utilized for checking a frequency characteristic.

Next, a frequency characteristic was measured for each gap. A test device 40 illustrated in FIG. 14 was utilized for a measurement. The test device 40 included a network analyzer 41, an amplifier circuit 42 connected to the network analyzer 41, a speaker 43, and a microphone 44. The differential pressure sensor 1 for a measurement was connected to the network analyzer 41 through the amplifier circuit 42. Sound waves with a particular frequency generated by the network analyzer 41 were emitted from the speaker 43. The differential pressure sensor 1 had the cantilever 8 vibrated by the sound waves emitted from the speaker 43, and thus the resistance changed. According to this device 40, a change in the resistance was amplified by the amplifier circuit 42, and measured through the network analyzer 41. While at the same time, sound waves emitted from the speaker 43 were measured through the microphone 44.

Figure 15:
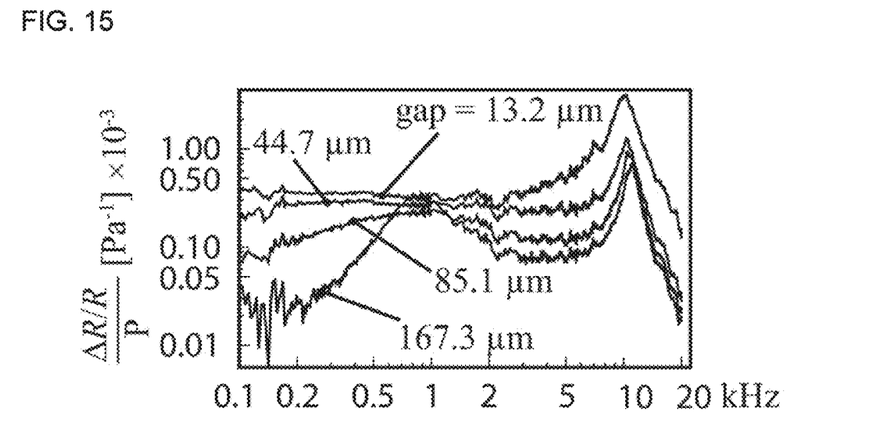
FIG. 15 is a graph illustrating a frequency characteristic of the differential pressure sensor.

FIG. 15 illustrates a result. As illustrated in this figure, it was confirmed that the smaller the gap 13 became, the more the frequency characteristic became flat. More specifically, it was confirmed that when the gap 13 was equal to or smaller than 44.7 μm, although the frequency characteristic from 100 Hz to 7 kHz became flat, the differential pressure sensor was available as a microphone within such a frequency range in comparison with the measurement result of the microphone 44.

Modified Example

The present invention is not limited to the above-explained embodiment, and can be modified as needed without departing from the scope and spirit of the present invention.

For example, in the above-explained embodiment, the explanation was given of the case in which the detector 5 is fastened to the surface 6 of the main body 4, but the present invention is not limited to this case. The detector 5 may be formed together with a component forming the top face of the main body 4. In this case, the opening of the main body 4 serves as the communication channel of the detector 5.

REFERENCE SIGNS LIST

1 Differential pressure sensor
2 Air chamber
3 Opening
4 Main body
5 Detector
8 Cantilever
12 External edge
13 Gap
23 Piezo resistor layer

The invention claimed is:

1. A differential pressure sensor comprising:
a main body formed with an air chamber, and an opening that causes an interior of the air chamber to be in communication with an exterior; and
a detector provided at the opening,
the main body being closed except the opening,
the detector comprising a cantilever provided in a manner tiltable so as to block off the opening,
the cantilever being formed with a piezoresistor layer,
a gas flowing between the interior of the air chamber and the exterior through a gap formed between an external edge of the cantilever and the opening, and
the gap being equal to or smaller than 100 times of an average free path of molecules of the gas flowing in the air chamber from the exterior through the gap.

2. The differential pressure sensor according to claim 1, wherein the gap is equal to or smaller than 7 μm.

3. The differential pressure sensor according to claim 1, wherein a thickness of the cantilever is 0.03 μm to 3 μm.

4. The differential pressure sensor according to claim 1, wherein the differential pressure sensor employs a structure in which a first layer forming the main body and a second layer forming the detector are laminated together.

5. A microphone comprising the differential pressure sensor according to claim 1.

* * * * *